Figure 1:
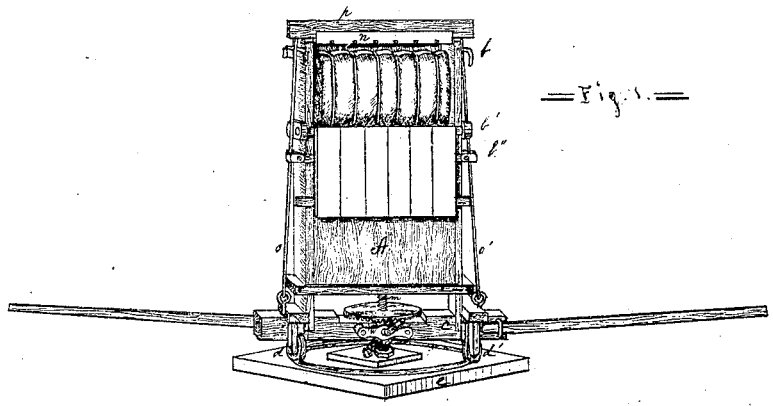

F. SIMMONS.
Improvement in Cotton-Presses.

No. 114,056. Patented April 25, 1871.

Witnesses.

Inventor.

Franklin Simmons

UNITED STATES PATENT OFFICE.

FRANKLIN SIMMONS, OF NEW ORLEANS, LOUISIANA.

IMPROVEMENT IN COTTON-PRESSES.

Specification forming part of Letters Patent No. 114,056, dated April 25, 1871.

I, FRANKLIN SIMMONS, of the city of New Orleans and State of Louisiana, have invented certain Improvements in Cotton-Presses, of which the following is a specification, reference being had to the drawing annexed, constituting a part thereof.

My improvement has for its primary object the compressing of cotton to any degree or extent, only limited by the strength of the materials which compose the compressing apparatus. For general purposes, however, it is intended to be applicable to the ordinary uses of a planter's baling-press, and as such to be simple but effective in its operations in practice.

With my invention I am enabled to compress a bale of cotton in much less time, with the same labor, than is required with most of the presses in general use, and hence I accomplish a most desirable result—namely, the saving of labor and expense.

To the great cotton interests of the cotton-growing States economy in time and labor is a most important item in the production of cotton, whereby my invention becomes of great value, not only to the planters, but to the public generally.

It is likewise equally important to the planting interests that cotton should be sent to market well and perfectly baled, in order to secure it from unnecessary waste, and that it may arrive at its destination in good condition.

My improvement, while it accomplishes all of the above desirable results, is of simple and easy construction, and, on account of its simplicity, strength, durability, and efficiency, will be entitled to the commendation of all persons engaged in the production and transportation of cotton to a market.

My invention will be more clearly understood by reference to the drawing annexed, wherein the similar letters or figures refer to the similar parts thereof, and in which—

Figure 2:
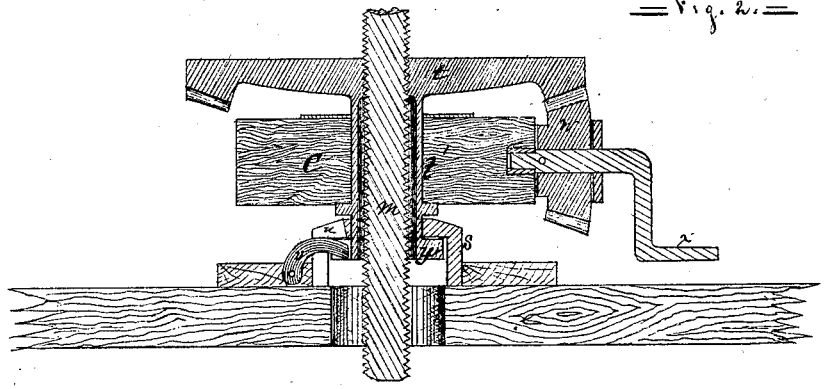

Figure 1 is a perspective view of my cotton-press, showing also a bale of cotton complete and ready to be delivered therefrom in the manner hereinafter more fully described. Fig. 2 is an enlarged sectional view of the lower mechanical working parts of my device, which is designed to show more clearly the several parts thereof.

My press is designed to be worked by hand or animal power; but for all ordinary purposes, as a planters' baling-press, animal power is the most desirable for all practical operations. It may be made of wood and metal, or all metal; but it is preferable to make it of both of these materials, as will be perceived by reference to its several and separate parts.

My improvement consists mainly of an upright truncated packing press or box, constructed of heavy timbers or planks, and surrounded or banded at intervals of its elevation by heavy and substantial framing timbers to secure the said pressing-box from spreading laterally when the bale of cotton is being subjected to the pressure of the follower within, worked as it is by means of the screw, and the revolutions of the press by the hand or animal power applied for this purpose.

The upright packing-press is represented on the drawing by the letter A, and the timber-frame bands above mentioned, which surround the same, by $b$ $b'$ $b''$.

The whole of the above-described superstructure rests upon a strong horizontal timber frame, $c$, and the apparatus, thus partially complete, revolves upon a series of grooved wheels, $d$ $d'$, (with two others not shown on the drawing,) running upon a table or platform, which is provided with an endless rail of iron, made to correspond to the grooves in the wheels aforesaid; or the said rail may be made flat or grooved, or in any desired form, and the wheels likewise may be made without grooves, or in any manner to correspond with the rails adopted in practice.

Through the platform $c$ runs the screw $m$, to the upper end of which is securely attached the follower, which is grooved in the usual manner to receive the bands or ropes employed to secure the cotton when relieved from the press; and the upper platen, $n$, is likewise grooved upon its upper face for a similar object.

The upper platen, $n$, is firmly held against the pressure to which it will be subjected in practice by means of strong iron rods O O', connecting the cross-head timber $p$ with the lower horizontal timber-frame, $c$, above mentioned. The platen $n$ is also secured to the cross-head timber $p$ to prevent its dropping into the press when not in use and to allow of its being swung to one side while the process of packing the cotton within the pressing-box is being performed.

Upon the lower platform, $e$, is a second and smaller platform, raised above the surface of the lower one sufficiently to receive a strong metal coupling, $s$, so constructed as to receive within its inner periphery the lower projecting collar of the bevel-wheel and screw-nut $t$. This coupling, it will be perceived, forms the connecting-link between the base-frame or platform and of the superstructure, constituting the press complete, and serves likewise the important purpose of preventing the bevel-wheel and screw-nut $t$ from working up and down. Another collar or projection above the coupling $s$ and upon the screw-nut assists in the accomplishment of a similar purpose.

The coupling $s$ is provided with a slot, $u$, upon one side thereof, and the lower collar or projection which works within the coupling $s$ is likewise provided with a slot, and when these two slots are placed in the same vertical line or position the pawl $v$ can be dropped therein, and in this manner the screw-nut and bevel-wheel $t$, which, it will be perceived, are one and the same piece of metal, are permanently and rigidly fixed, so that when the press is revolved either by hand or animal power the screw is made to turn, and hence to elevate the follower, and thereby secure the operation of pressing the cotton placed within the packing or pressing box A. On the contrary, when the pawl $v$ is thrown out of the slots, the bevel-wheel and screw-nut $t$ may be made to revolve by means of the bevel-pinion $w$, worked by the crank $x$, and thus the follower be made to descend in order to relieve the bale from pressure and admit its delivery from the pressing-box through a portion of the side thereof, which is pivoted to swing outwardly for this purpose. That portion pivoted is shown at 2, and the opposite side is constructed in a similar manner, so that the cotton to be packed may be received or delivered from either side, at the pleasure of the operator.

The operation of relieving the cotton-bale from the pressure to which it has been subjected, when this operation is completed, is a characteristic feature of my invention, and one which, in this respect, distinguishes it from all other presses with which I am familiar, depending upon the press-revolving process for its operations in practice. All the other presses working in this manner have to be reversed to effect the operation of releasing the bale from the pressure when complete.

Having described my invention, what I desire to secure by Letters Patent is the following:

1. In the cotton-press herein described, the bevel-wheel $t$, nut $t'$, ratchet $y$, when cast in one piece and combined with the screw $m$ and pawl $u$, all being constructed and arranged to operate as shown, for the purpose set forth.

2. The arrangement, in the press herein described, of the frame A, screw $m$, bevel-wheel $t$, pinion $w$, nut $t'$, ratchet $w$, pawl $u$, collar $s$, platform $c$, and the rollers $d$, when all are constructed and operated substantially as shown and specified.

FRANKLIN SIMMONS.

Witnesses:
H. N. JENKINS,
L. J. OLMSTEAD.